(12) United States Patent
Murray et al.

(10) Patent No.: US 8,226,173 B1  
(45) Date of Patent: Jul. 24, 2012

(54) SUPPLEMENTAL BRAKE SYSTEM

(75) Inventors: Edward Michael Murray, Fenton, MI (US); Ralf Pionke, Farmington Hills, MI (US)

(73) Assignee: AM General LLC, South Bend, IN (US)

(*) Notice: Subject to any disclaimer, the term of this patent is extended or adjusted under 35 U.S.C. 154(b) by 868 days.

(21) Appl. No.: 12/313,295

(22) Filed: Nov. 18, 2008

(51) Int. Cl.  
*B60T 15/16* (2006.01)

(52) U.S. Cl. ............................ 303/13; 303/11; 303/116.1

(58) Field of Classification Search .............. 303/13–15, 303/11, 115.2–115.4, 116.1, 116.2, 119.1  
See application file for complete search history.

(56) References Cited

U.S. PATENT DOCUMENTS

| | | | | |
|---|---|---|---|---|
| 3,677,608 A | * | 7/1972 | Lewis | 303/115.5 |
| 5,302,008 A | * | 4/1994 | Miyake et al. | 303/14 |
| 6,957,870 B2 | * | 10/2005 | Kagawa et al. | 303/113.4 |
| 7,152,931 B2 | * | 12/2006 | Suzuki et al. | 303/10 |

OTHER PUBLICATIONS

Maintenance Manual MM-0401, Meritor WABCO Hydraulic Power Brake (HPB) System (2004).  
Hydraulic Power Brake (HPB) Catalog, Meritor WABCO Parts Book, PB-06107 (2008).

* cited by examiner

*Primary Examiner* — Melanie Torres Williams  
(74) *Attorney, Agent, or Firm* — Barnes & Thornburg LLP

(57) ABSTRACT

A brake system for a vehicle includes a brake unit, a master cylinder, an accumulator, and a manifold configurable to direct brake fluid pressure generated by the master cylinder to the accumulator or to the brake unit. A solenoid valve can be used to hydraulically align the manifold. The brake system can be used as an adjunct or supplement to a vehicle's primary service brake system.

22 Claims, 3 Drawing Sheets

SUPPLEMENTAL BRAKE SYSTEM

BACKGROUND OF THE INVENTION

Hydraulic brake systems for automobiles and other wheeled and tracked vehicles are known in the art. A four-wheel hydraulic disc service brake system 10 commonly used in passenger cars is illustrated in simplified schematic form in FIG. 1. Brake system 10 includes brake pedal 12 that serves as the interface between the vehicle's operator and the rest of brake system 10. By controlling brake pedal 12, the vehicle's operator can use brake system 10 to slow or stop the vehicle.

Brake pedal 12 is mechanically coupled to master cylinder 14, as would be understood by one skilled in the art. Master cylinder 14 is hydraulically coupled via brake lines 16 to brake calipers 18, each of which is operably associated with a corresponding one of the vehicle's four wheels. Each brake caliper 18 also is operably associated with a corresponding brake rotor 20 through a pair of brake pads (not shown), as would be understood by one skilled in the art. Each brake rotor 20 is attached to a corresponding wheel hub (not shown) so that it can rotate with the corresponding wheel hub and wheel (not shown).

When brake pedal 12 is depressed, master cylinder 14 acts to displace and pressurize brake fluid in brake lines 16 and brake calipers 18, causing the brake pads (not shown) to be pressed against the corresponding rotor 20, as would be understood by one skilled in the art. Friction between the brake pads and rotors 20 tends to slow and/or stop the rotors, if rotating, and to maintain the rotors at rest, if not rotating. When brake pedal 12 is released, master cylinder 14 acts to allow the brake fluid in brake lines 16 and calipers 18 to return toward its original state, in turn allowing the brake pads to return toward their original states, as would be understood by one skilled in the art.

Operation of system 10 requires only the application to and release of force from brake pedal 12. No other external power, for example, electrical or engine power, is necessary to operate system 10. Although system 10 may further include some form of boost system, for example, a vacuum boost system, to lessen the physical effort required for operation of system 10, as would be understood by one skilled in the art, such a boost system is not required. Further, even if such a boost system were provided, the boost system would not need to be operable in order for system 10 to otherwise be operable. As such, system 10 is generally operable at all times except when the system is out of service for maintenance or in the event of significant component failure.

As an adjunct to service brake system 10, passenger cars typically also include some form of parking brake system. Although, such parking brake systems may share certain components with the vehicle's service brake system, they typically are actuated by purely mechanical means (for example, using a cable), not hydraulically, using a parking brake lever or a parking brake pedal that is separate from and independent of brake pedal 12. Operation of such parking brake systems typically requires only the application of force to the parking brake lever or pedal and associated release mechanism. No external power is necessary.

Certain hydraulic service brake systems used in trucks, buses, and the like are more complicated. One such hydraulic service brake system 100 is illustrated in simplified schematic form in FIG. 2. Similar to the typical passenger car service brake system 10 described above and illustrated in FIG. 1, system 100 includes brake pedal 112 coupled to master cylinder 114 in a conventional manner and brake calipers 118 operably associated with corresponding brake rotors 120 in a conventional manner. System 100, however, also includes a number of additional components not found in system 10, and system 100 operates in a significantly different manner than does system 10.

In addition to the components set forth above, system 100 includes manifold 122, hydraulic pump 124, electric pump motor 126, and gas-filled hydraulic accumulator 128. Manifold 122 is hydraulically coupled to master cylinder 114, brake calipers 118, hydraulic pump 124, and accumulator 128.

In use, pump motor 126 drives hydraulic pump 124, which pumps brake fluid from a reservoir (not shown) into accumulator 128, thereby pressurizing accumulator 128 with brake fluid. A control unit (not shown) controls the operation of pump motor 126 in response to signals received from pressure sensors (not shown) associated with accumulator 128 to maintain the brake fluid pressure in accumulator 128 within a predetermined range.

When brake pedal 112 is depressed, master cylinder 114 acts to displace and pressurize the brake fluid in brake lines 116A coupling master cylinder 114 and manifold 122, thereby actuating relay valves (not shown) in manifold 122, as would be understood by one skilled in the art. So actuated, the relay valve hydraulically couples accumulator 128 and brake calipers 118 through brake lines 116B, 116C, thereby displacing and pressurizing the brake fluid in brake lines 116B, 116C and brake calipers 118, in turn causing the brake pads (not shown) to be pressed against the corresponding rotors 120, as would be understood by one skilled in the art. When brake pedal 112 is released, master cylinder 114 acts to allow the brake fluid in brake lines 116A to return toward its original state, in turn allowing the relay valves to return toward their original states, thereby hydraulically uncoupling accumulator 128 and brake line 116B from brake lines 116C and brake calipers 118. With brake lines 116C and brake calipers 118 thus uncoupled from accumulator 128 and brake line 116B, a relief valve (not shown) bleeds brake fluid from brake lines 116C and calipers 118 back to the reservoir (not shown), thereby de-pressurizing brake lines 116C and calipers 118 and allowing calipers 118 and the brake pads to return toward their original states, as would be understood by one skilled in the art.

An optional parking brake system (not shown) can be provided as an adjunct to service brake system 100. Such a parking brake system typically would include a parking brake caliper and rotor and means to actuate and release the parking brake caliper. Typically, such a parking brake caliper would use a spring to press the brake pads against the rotor and would use hydraulic pressure provided by accumulator 128 and pump 124 and controlled by a valve (not shown) associated with manifold 122 to release the brake pads from the rotor, as would be understood by one skilled in the art.

Unlike brake system 10, brake system 100 requires external power for normal operation because the hydraulic pressure that actuates calipers 118 to press the brake pads against the rotors ultimately is generated by pump 124, which is driven by electric pump motor 126. (Embodiments including the foregoing, optional, parking brake system also require hydraulic pressure from the same source to release the parking brake pads from the parking brake rotor as discussed above.) Pump motor 126 typically would be operable with the vehicle's ignition switched "on" and operating power, for example, battery power, available and inoperable with the vehicle's ignition switched "off" and/or operating power unavailable.

Although accumulator 128 stores hydraulic energy for use in normal operation of system 100, the amount of hydraulic energy stored by accumulator 128 is limited and typically would be sufficient to effect only a few brake applications (or releases of the parking brake). Further, over an extended period of non-use, the energy stored in accumulator 128 could bleed down to a level insufficient for normal operation of brake system 100. With pump motor 126 and, therefore, pump 124, inoperable and accumulator 128 drained of sufficient, stored hydraulic energy, brake system 100 is incapable of actuating calipers 118 (or releasing the parking brake caliper, where provided).

SUMMARY OF THE INVENTION

The present invention is directed to a vehicle brake system having a user control, for example, a brake pedal, and a brake unit, for example, a brake caliper, which brake system can operate in two modes. In the first mode, operation of the user control does not actuate the brake unit. In the second mode, operation of the user control does actuate the brake unit. The brake system of the present invention preferably is used as an adjunct to a vehicle's service brake system, for example, brake system 10 discussed above or a similar system. More preferably, the brake system of the present invention is used as an adjunct to a service brake system having limited or no functionality in the absence of external power, for example, system 100 discussed above or a similar system. In such embodiments, both the service brake system and the brake system of the present invention preferably are operated using the same user control, for example, a single brake pedal. In alternate embodiments, the brake system of the present invention could be operated independently from the service brake system or used as an adjunct to another form of service brake system or as a stand-alone brake system.

A brake system according to the present invention preferably includes a user control, a master cylinder, a brake unit, an accumulator, and a manifold including a diverter that directs brake pressure developed by the master cylinder to the accumulator in the first mode of operation and that directs such brake pressure to the brake unit in the second mode of operation. Preferably, the diverter is embodied as a solenoid valve configured to support the first mode of operation when energized and the second mode of operation when de-energized.

DETAILED DESCRIPTION OF THE ILLUSTRATED EMBODIMENTS

Figure 1:
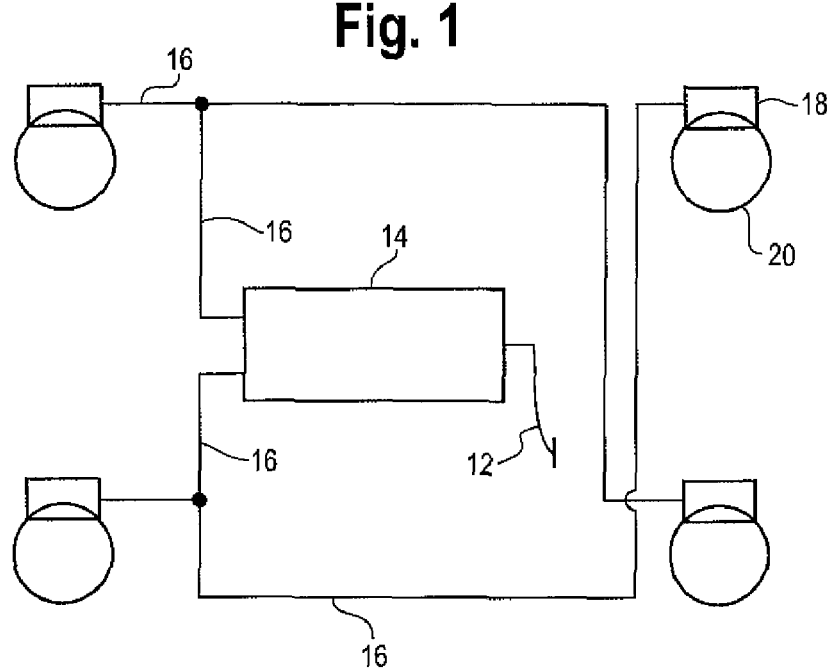
FIG. 1 is a simplified schematic representation of a conventional passenger car hydraulic brake system.
Figure 2:
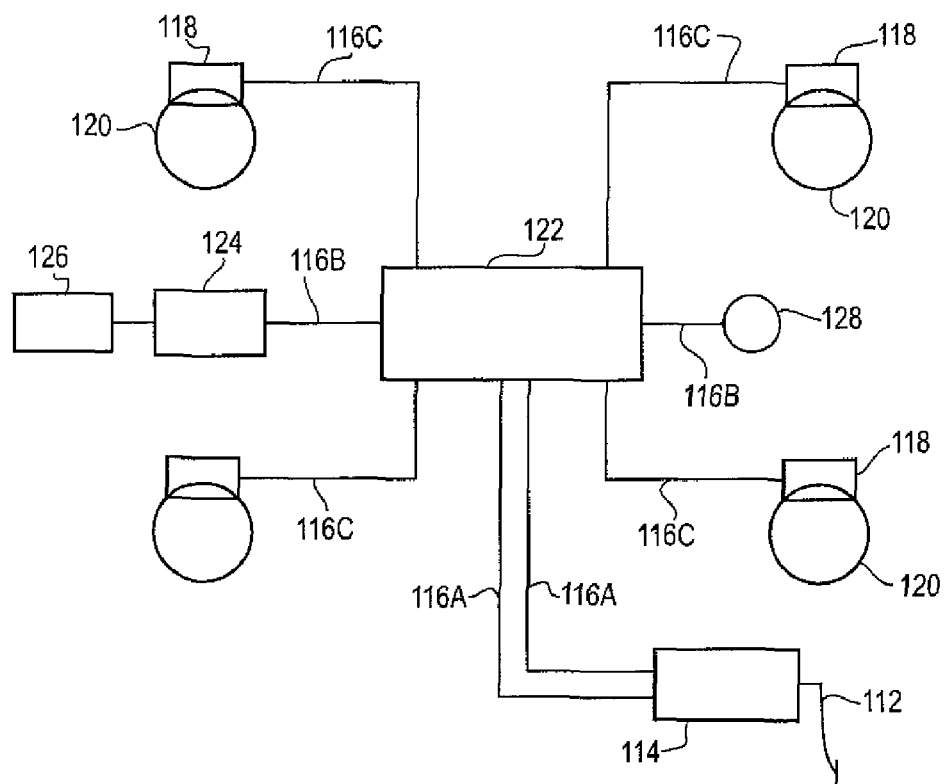
FIG. 2 is a simplified schematic representation of a conventional truck hydraulic power brake system.
Figure 3:
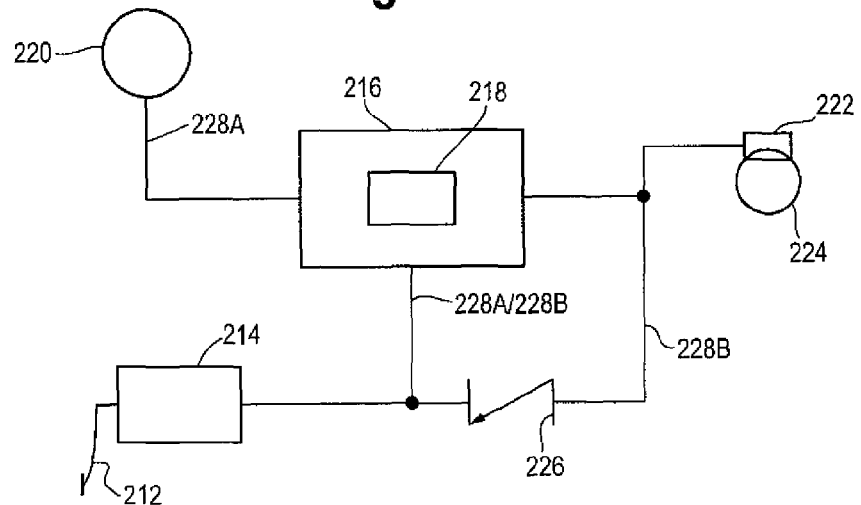
FIG. 3 is a schematic representation of a brake system according to the present invention.

FIG. 3 illustrates schematically brake system 200 according to a preferred embodiment of the present invention, wherein brake system 200 includes brake pedal 212, master cylinder 214, manifold 216, diverter 218, accumulator 220, brake caliper 222, brake pads (not shown), brake rotor 224, check valve 226, and brake lines 228 which hydraulically couple master cylinder 214, manifold 216, accumulator 220, brake caliper 222, and check valve 226.

Master cylinder 214 can be embodied as any suitable hydraulic cylinder capable of pressurizing a single hydraulic brake line. For example, master cylinder 214 could be embodied as a conventional brake system master cylinder configured to pressurize a single brake line. Alternatively, master cylinder 214 could be configured as a conventional hydraulic clutch master cylinder. Master cylinder 214 could be embodied in other ways, as well. For example, a tandem master brake master cylinder could be adapted for use with the brake system of the present invention by tying its hydraulic outputs together or plugging or otherwise defeating one of its hydraulic outputs, as would be understood by one skilled in the art. Brake pedal 212 can be connected to master cylinder 214 in any suitable way, as would be recognized by one skilled in the art. Preferably, brake pedal 212 is connected to master cylinder 214 using a conventional, mechanical linkage. In alternate embodiments, brake pedal 212 could be embodied as another form of user control, for example, a lever.

Brake caliper 222 can be a conventional brake caliper, for example, a brake caliper similar to brake caliper 18 or brake caliper 118. Likewise, brake rotor 224 can be conventional brake rotor, for example, a brake rotor similar to brake rotor 20 or brake rotor 120. Brake rotor 224 could be attached to any suitable driveline component, for example, a wheel hub, half-shaft, or drive shaft, and brake caliper 222 could be attached to a corresponding body or chassis component, as would be understood by one skilled in the art. In alternate embodiments, another suitable form of brake unit, for example, a drum brake unit, could serve as a substitute for brake caliper 222 and brake rotor 224, as would be recognized by one skilled in the art.

Accumulator 220 can be any suitable hydraulic accumulator, for example, a gas-charged hydraulic accumulator as might be used, for example, to embody accumulator 128 of brake system 100. Check valve 228 can be any check valve suitable for use in a hydraulic brake system.

Manifold 216 preferably includes three hydraulic ports to which master cylinder 214, accumulator 220 and brake caliper 222, respectively, can be connected. Manifold 216 preferably is configured to direct brake line pressure generated by master cylinder 214 either to brake caliper 222 or to accumulator 220, depending on the state of diverter 218 which controls the hydraulic alignment of manifold 216. In other embodiments, brake pressure generated by master cylinder 214 could be diverted in additional ways, as well.

With diverter 218 in a first state corresponding to the first mode of operation, manifold 216 is hydraulically aligned to direct brake line pressure generated by master cylinder 214 to accumulator 220, and not to brake caliper 222. Thus, with diverter 218 in the first state and check valve 226 in its normal, closed position, operation of brake pedal 212 has no effect on brake caliper 222.

With diverter 218 in a second state corresponding to the second mode of operation, manifold 216 is hydraulically aligned to direct brake line pressure generated by master cylinder 214 to brake caliper 222 and not to accumulator 220. Thus, with diverter 218 in the second state, operation of brake pedal 212 results in normal operation of brake caliper 222. More particularly, depressing brake pedal 212 would cause master cylinder 214 to displace and pressurize brake fluid in brake lines 228B and brake caliper 222, causing the brake pads (not shown) to be pressed against the corresponding rotor 224, as would be understood by one skilled in the art. Conversely, releasing brake pedal would cause master cylinder 214 to return toward its original state, allowing the brake fluid in brake lines 228B and brake caliper 222 to return toward its original state, in turn allowing the brake pads to return toward their original states, as would be understood by one skilled in the art.

The position of check valve 226 is substantially irrelevant in the second mode of operation because the brake line pressure on both sides of check valve 226 would be substantially equal, regardless of whether brake pedal 212 were depressed or released or whether check valve 226 were open or closed. In the event, however, that brake pedal 212 were to be depressed with diverter 218 in the second state, diverter 218 were to change state to the first state with brake pedal 212 still being depressed, and brake pedal 212 were to then be released, the brake line pressure on the caliper side of check valve 226 would be higher than the brake line pressure on the master cylinder side of check valve 226. Accordingly, check valve 226 would open to equalize to the brake line pressure on both sides of check valve 226.

Preferably, diverter 218 is embodied as a solenoid valve. Preferably, the solenoid valve would be in the first state when energized and in the second state when de-energized. Energization and de-energization of the solenoid valve could be controlled as desired. For example, power to the solenoid valve could be controlled such that the solenoid valve is energized when the ignition of a vehicle in which brake system 200 is installed is switched "on" and operating power (for example, battery power) is available and de-energized when the ignition is switched "off" and/or operating power is unavailable. Diverter 218 could be embodied in other ways, as well, as would be recognized by one skilled in the art.

Figure 4:
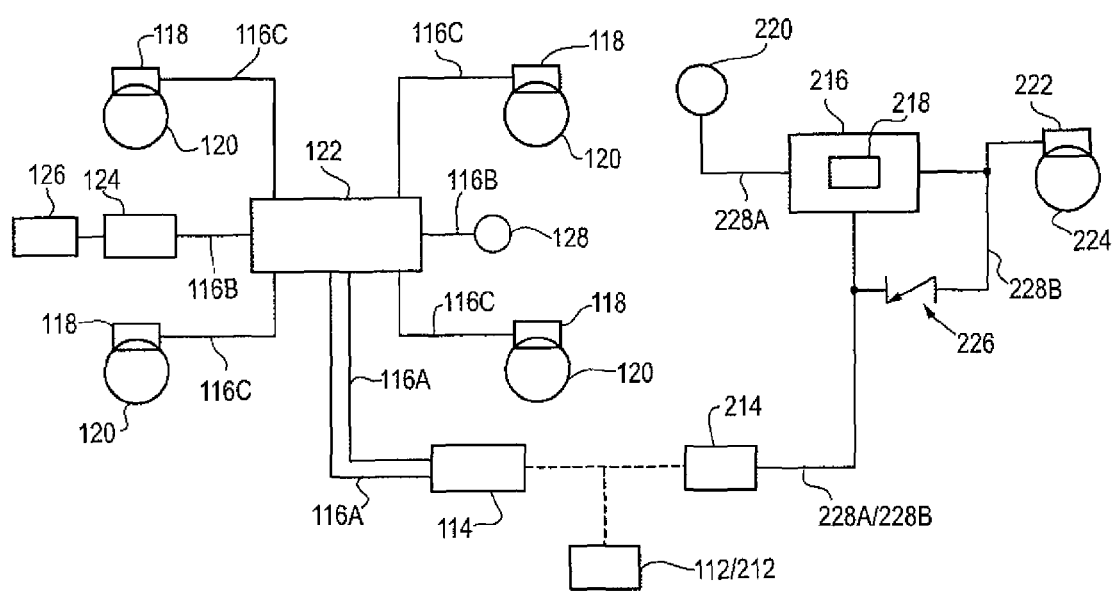
FIG. 4 is a schematic representation of a brake system according to the present invention as an adjunct to the brake system illustrated in FIG. 2.

FIG. 4 illustrates an embodiment wherein brake system 200 is used as an adjunct to brake system 100 (less the optional parking brake), which is configured to provide regular braking function during normal operation of the vehicle, as discussed above. In the FIG. 4 embodiment, a single brake pedal 112/212 operates both brake system 10 and brake system 200. In this embodiment, brake pedal 112/212 preferably is connected to both master cylinder 114 and master cylinder 214 in any suitable way, preferably by conventional, mechanical means, as would be recognized by one skilled in the art. Alternatively, brake pedal 112/212 could be embodied as another form of user control, for example, a lever, coupled to master cylinder 114 and master cylinder 214. In other alternate embodiments, brake system 100 and brake system 200 could have separate brake pedals or other user controls. In such embodiments, a cross-tie mechanism could be provided to selectively link the two brake pedals or other user controls such that they functionally emulate a single user control.

Figure 5:
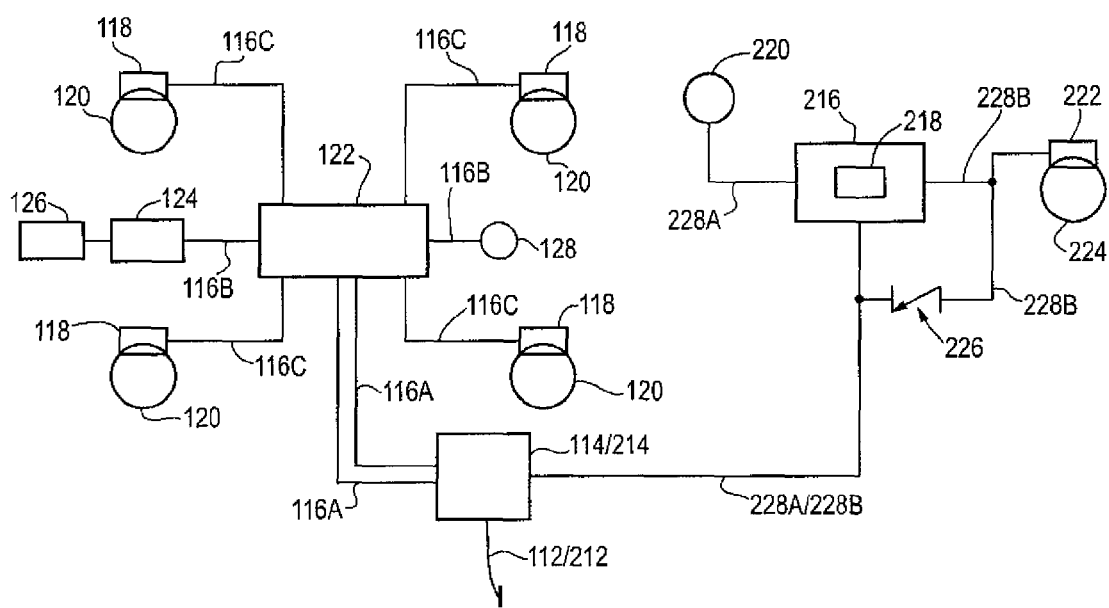
FIG. 5 is a schematic representation of a brake system according to the present invention as an adjunct to the brake system illustrated in FIG. 2.

FIG. 5 illustrates an alternate embodiment wherein brake system 200 is used as an adjunct to brake system 100 (less the optional parking brake), which is configured to provide regular braking function during normal operation of the vehicle, as discussed above. In the FIG. 5 embodiment, a single brake pedal 112/212 and a single master cylinder 114/214 operate both brake system 10 and brake system 200. In this embodiment, brake pedal 112/212 is connected to master cylinder 114/214 in any suitable way, and master cylinder 114/214 is hydraulically coupled to both brake line 116A and brake line 228A/228B. Master cylinder 114/214 is illustrated in FIG. 5 as having three hydraulic ports. Master cylinder 114/214 could be embodied in other ways, as well, as would be recognized by one skilled in the art. For example, a conventional tandem master cylinder could be adapted to be hydraulically coupled to brake lines 116A and brake line 228A/228B.

Although brake system 100 and brake system 200 are operated using a single brake pedal 112/212 in the FIGS. 4 and 5 embodiments, they otherwise operate independently and as described with respect to the preferred embodiments set forth above. More particularly, with the vehicle's ignition switched "on" and operating power available, operation of brake pedal 112/212 results in brake system 100 providing normal braking function as described above. Under the same conditions, diverter 218 hydraulically aligns manifold 216 such that brake fluid pressure generated by master cylinder 214 is directed to accumulator 220, and not to brake caliper 222, such that operation of brake pedal 112/212 does not result in brake system 200 providing braking function.

Conversely, with the vehicle's ignition switched "off" and/or battery power unavailable, diverter 218 hydraulically aligns manifold 216 such that brake fluid pressure generated by master cylinder 214 is directed to brake caliper 222, and not to accumulator 220, such that operation of brake pedal 112/212 results in brake system 200 providing braking function. As such, operation of brake pedal 112/212 results in brake system 200 providing braking function. Under the same conditions, operation of brake pedal 112/212 results in brake system 100 providing braking function only if and to the extent that accumulator 128 contains sufficient stored hydraulic energy to do so.

As such, in the FIGS. 4 and 5 embodiments, brake system 200 supplements brake system 100 by providing braking function under conditions when brake system 100 is or is likely to be inoperable, for example, when the vehicle's ignition is off or operating power is unavailable, and by not providing braking function or otherwise interfering with the operation of brake system 100 when brake system 100 is operable. Further, because both brake system 100 and brake system 200 preferably use the same brake pedal, and because the applicable operating mode of brake system 200 is selected substantially automatically as a function of ignition switch position and/or operating power availability, the integration of brake system 100 with brake system 200 is perceived to be seamless by the operator.

The foregoing description and drawing figures disclose certain embodiments of the present invention, but do not limit its scope, which is defined solely by the appended claims. One skilled in the art would recognize that the embodiments disclosed herein could be modified without departing from the scope of the invention as claimed below.

The invention claimed is:

1. A brake system for a vehicle, said brake system comprising:
    a hydraulic manifold having a first port, a second port, and a third port, said hydraulic manifold operable to hydraulically align said first port with said second port and not said third port in a first mode of operation and to hydraulically align said first port with said third port and not said second port in a second mode of operation;
    a master cylinder hydraulically coupled to said first port;
    an accumulator hydraulically coupled to said second port;
    a brake unit hydraulically coupled to said third port; and
    a user control coupled to said master cylinder;
    wherein said master cylinder is operated using said user control.

2. The brake system of claim 1 further comprising a check valve hydraulically coupled to said brake unit and to said master cylinder.

3. The brake system of claim 1 wherein said brake unit comprises a brake caliper and a brake rotor.

4. The brake system of claim 1 wherein said brake unit comprises a drum brake unit.

5. The brake system of claim 1 further comprising a solenoid valve operable to selectively hydraulically align said manifold in said first mode of operation or said second mode of operation.

6. The brake system of claim 5 wherein said solenoid is energized in said first mode of operation and de-energized in said second mode of operation.

7. The brake system of claim 5 wherein said vehicle includes an ignition switch and the energization and de-energization of said solenoid valve is controlled by said ignition switch.

8. A supplemental brake system for a vehicle having a service brake system, said supplemental brake system comprising:
- a hydraulic manifold having a first port, a second port, and a third port, said hydraulic manifold operable to hydraulically align said first port with said second port and not said third port in a first mode of operation and to hydraulically align said first port with said third port and not said second port in a second mode of operation;
- a master cylinder hydraulically coupled to said first port;
- an accumulator hydraulically coupled to said second port;
- a brake unit hydraulically coupled to said third port; and
- a user control coupled to said master cylinder;
- wherein said master cylinder and said service brake system are operated using said user control.

9. The brake system of claim 8 further comprising a check valve hydraulically coupled to said brake unit and to said master cylinder.

10. The brake system of claim 8 wherein said brake unit comprises a brake caliper and a brake rotor.

11. The brake system of claim 8 wherein said brake unit comprises a drum brake unit.

12. The brake system of claim 8 further comprising a solenoid valve operable to selectively hydraulically align said manifold in said first mode of operation or said second mode of operation.

13. The brake system of claim 12 wherein said solenoid is energized in said first mode of operation and de-energized in said second mode of operation.

14. The brake system of claim 12 wherein said vehicle includes an ignition switch and the energization and de-energization of said solenoid valve is controlled by said ignition switch.

15. The brake system of claim 12 wherein said service brake system is substantially inoperable in the absence of electrical power.

16. The brake system of claim 8 wherein said service brake system comprises a second master cylinder and said user control is further coupled to said second master cylinder.

17. The brake system of claim 8 wherein said master cylinder is further hydraulically coupled to said service brake system.

18. A supplemental brake system for a vehicle having a service brake system, said supplemental brake system comprising:
- a hydraulic manifold having a first port, a second port, and a third port, said hydraulic manifold operable to hydraulically align said first port with said second port and not said third port in a first mode of operation and to hydraulically align said first port with said third port and not said second port in a second mode of operation;
- a master cylinder hydraulically coupled to said first port;
- a solenoid valve operable to selectively hydraulically align said manifold in said first mode of operation or said second mode of operation;
- an accumulator hydraulically coupled to said second port;
- a brake unit hydraulically coupled to said third port;
- a check valve hydraulically coupled to said brake unit and to said master cylinder;
- a user control coupled to said master cylinder;
- wherein said master cylinder and said service brake system are operated using said user control.

19. The brake system of claim 18 wherein said solenoid is energized in said first mode of operation and de-energized in said second mode of operation.

20. The brake system of claim 19 wherein said vehicle includes an ignition switch and the energization and de-energization of said solenoid valve is controlled by said ignition switch.

21. The brake system of claim 18 wherein said service brake system comprises a second master cylinder and said user control further is coupled to said second master cylinder.

22. The brake system of claim 18 wherein said master cylinder is further hydraulically coupled to said service brake system.

\* \* \* \* \*